(12) United States Patent
Wang

(10) Patent No.: US 12,150,459 B2
(45) Date of Patent: Nov. 26, 2024

(54) MOUTHFEEL MAINTAINING METHOD OF ICE CREAM MACHINE

(71) Applicant: Hubei Guangshen Electric Produce Co., Ltd., Hubei (CN)

(72) Inventor: Xinbing Wang, Hubei (CN)

(73) Assignee: Hubei Guangshen Electric Produce Co., Ltd., Xianning (CN)

(*) Notice: Subject to any disclaimer, the term of this patent is extended or adjusted under 35 U.S.C. 154(b) by 514 days.

(21) Appl. No.: 17/431,424

(22) PCT Filed: Apr. 4, 2019

(86) PCT No.: PCT/CN2019/081477
§ 371 (c)(1),
(2) Date: Aug. 17, 2021

(87) PCT Pub. No.: WO2020/168621
PCT Pub. Date: Aug. 27, 2020

(65) Prior Publication Data
US 2022/0117256 A1    Apr. 21, 2022

(30) Foreign Application Priority Data
Feb. 21, 2019   (CN) .......................... 201910129103.0

(51) Int. Cl.
*A23G 9/12* (2006.01)
*A23G 9/22* (2006.01)
*G05B 19/042* (2006.01)

(52) U.S. Cl.
CPC ............... *A23G 9/228* (2013.01); *A23G 9/12* (2013.01); *G05B 19/042* (2013.01); *G05B 2219/2654* (2013.01)

(58) Field of Classification Search
CPC .......... A23G 9/14; A23G 9/222; A23G 9/163; A23G 9/04; A23G 9/12; A23G 9/228
See application file for complete search history.

(56) References Cited

U.S. PATENT DOCUMENTS 2,959,932 A * 11/1960 Spergel .................... A23G 9/20
                                                      62/304
4,275,567 A *  6/1981 Schwitters ............. A23G 9/045
                                                      62/136

(Continued)

FOREIGN PATENT DOCUMENTS

| CN | 106819340 A | 6/2017 |
| CN | 109152384 A | 1/2019 |

OTHER PUBLICATIONS

International Search Report of PCT Patent Application No. PCT/CN2019/081477 issued on Nov. 8, 2019.

*Primary Examiner* — Travis Ruby

(57) ABSTRACT

A mouthfeel maintaining method of an ice cream machine is provided. The ice cream machine is equipped with a freezing cylinder, a stirring device, a main refrigeration system, and a control system. When the ice cream material in the freezing cylinder is in a forming solid stage, the control system controls the ice cream machine to enter a mouthfeel maintaining state. The forming solid stage is: a stage from when all the ice cream material in the freezing cylinder is converted into all-solid ice cream until the preset hardness or the preset viscosity value is reached. The mouthfeel maintaining state is as follows that: the main refrigeration system refrigerates the ice cream material in the freezing cylinder according to the refrigeration capacity close to the lower limit refrigeration capacity. Moreover, the ice cream machine can discharge the all-solid ice cream in the freezing cylinder in the mouthfeel maintaining state.

5 Claims, 5 Drawing Sheets

(56) References Cited

U.S. PATENT DOCUMENTS

| | | | | |
|---|---|---|---|---|
| 4,712,920 A * | 12/1987 | Ames | ...................... | A23G 9/163 |
| | | | | 366/144 |
| 4,838,702 A * | 6/1989 | Torimitsu | ................ | A23G 9/228 |
| | | | | 366/144 |
| 5,158,506 A * | 10/1992 | Kusano | ................ | G07F 17/0071 |
| | | | | 62/342 |
| 5,743,097 A * | 4/1998 | Frank | ........................ | A23G 9/14 |
| | | | | 62/204 |
| 6,119,472 A * | 9/2000 | Ross | ........................ | A23G 9/225 |
| | | | | 62/342 |
| 11,369,125 B2 * | 6/2022 | Wang | ........................ | A23G 9/22 |
| 2008/0149655 A1 * | 6/2008 | Gist | .......................... | F25B 5/02 |
| | | | | 221/150 R |
| 2009/0211269 A1 * | 8/2009 | Gist | ........................ | F25C 1/145 |
| | | | | 62/135 |
| 2013/0269540 A1 * | 10/2013 | Lazzarini | ................. | A23G 9/28 |
| | | | | 99/455 |
| 2018/0228180 A1 * | 8/2018 | Cocchi | ..................... | A23G 9/12 |
| 2019/0110496 A1 * | 4/2019 | Cocchi | ................... | F25B 31/008 |
| 2021/0033332 A1 * | 2/2021 | Vijayan | ................. | F25B 41/385 |

* cited by examiner

MOUTHFEEL MAINTAINING METHOD OF ICE CREAM MACHINE

TECHNICAL FIELD

The invention relates to a mouthfeel maintaining method of an ice cream machine.

BACKGROUND

An existing ice cream machine is generally a design of a refrigeration system of a compressor-condenser-throttling device-evaporator-compressor. In general, an evaporator of the ice cream machine may include two modes: separate refrigeration of a freezing cylinder (there may be one or more freezing cylinders which are connected in parallel or in series) and simultaneous refrigeration of the freezing cylinder and a material basin. An existing general mechanical structure of the ice cream machine is a motor-reduction mechanism-shaft coupler-stirrer-discharging assembly. An existing general control mode of the ice cream machine includes a current control mode, a rotating speed control mode, and a temperature control mode, or a current+temperature control mode, a rotating speed+temperature control mode, and the like.

A normal working flow of a traditional ice cream machine is as follows that: after ice cream material is added, the machine is started to refrigerate, the temperature of the ice cream material in the freezing cylinder is gradually reduced and is gradually solidified and formed, when the set ice cream forming hardness/viscosity is reached, the rotating speed of a stirring motor is reduced or the temperature is reduced to a set value, a compressor and the stirring motor are stopped, the machine is in a standby state until the standby time is finished, and the machine automatically enters a refrigeration state again. In a machine refrigeration and forming process, after the forming degree is judged according to a temperature or current value and a rotating speed value displayed by the machine, a discharging handle may be operated to discharge; when ice cream needs to be sold in the standby time, the discharging handle is operated, and the discharging handle touches or senses a discharging switch to generate an ice cream discharging control signal, so that a stirring motor works, and a compressor is started after delaying a certain period of time; and after the compressor is restarted, the raw material in the freezing cylinder (new liquid ice cream material will enter into the freezing cylinder because formed ice cream is extruded) is refrigerated until the set hardness is reached.

As shown in FIG. 1, in the technical application of the existing ice cream machine industry, through conventional refrigeration control, a period in which the ice cream machine refrigerates the liquid ice cream material entering the freezing cylinder to become saleable ice cream with certain hardness or viscosity is generally divided into four stages.

At a first stage, a refrigeration starting stage: a system starts to refrigerate, the raw material in the freezing cylinder is room-temperature liquid ice cream material when entering the freezing cylinder, and the temperature starts to reduce through continuous stirring and simultaneous heat exchange until the temperature is reduced to a freezing point of the ice cream material in the freezing cylinder. At this stage, the ice cream material in the freezing cylinder is still a liquid, and the rotating speed and current of the stirring motor are not changed obviously, but the temperature is changed obviously.

At a second stage, a liquid-solid coexistence stage: through continuous heat exchange and stirring, when the temperature of the ice cream material in the freezing cylinder is gradually reduced to the freezing point of the ice cream material, a part of the ice cream material which is closely stirred with the freezing cylinder starts to change from a liquid to a solid, and the ice cream material in the freezing cylinder is in the liquid-solid coexistence stage. At this stage, the ice cream in the freezing cylinder is in liquid-solid coexistence, the rotating speed and the current of the stirring motor start to change, in general, the rotating speed of the stirring motor starts to slowly reduce, the current starts to slowly increase, and the temperature is reduced to a lower value.

At a third stage, a forming solid stage: through continuous heat exchange and stirring, the temperature of the ice cream material in the freezing cylinder continues to gradually reduce, all the ice cream in the freezing cylinder is formed, at this stage, all the ice cream in the freezing cylinder is solid ice cream until the set maximum hardness/viscosity (which may be a set current value, rotating speed value or temperature value) is reached, and the third stage is finished. At this stage, the ice cream in the freezing cylinder is converted from a liquid-solid mixture to an all-solid state, and the hardness/viscosity of the solid ice cream continues to increase. In this process, since the ice cream is refrigerated to the all-solid state, as the refrigeration continues (the hardness/viscosity of the solid ice cream rises, so that the stirring motor is overloaded), the rotating speed and the current of the stirring motor may be rapidly changed, in general, the rotating speed of the stirring motor starts to rapidly reduce, and the current starts to rapidly increase.

At a fourth stage, a standby stage: after the ice cream in the freezing cylinder reaches the set maximum hardness/viscosity, that is, after the third stage is finished, the machine enters the standby state, the compressor stops working, the temperature of the ice cream in the freezing cylinder is gradually increased, and the hardness/viscosity starts to decrease.

The control and operation modes of the traditional ice cream machine are further analyzed as follows.

In the existing technical background, regardless of the control mode, the first stage, that is, the time for reducing the temperature of the liquid ice cream material from the room temperature to the freezing point of the ice cream material is generally long because the refrigeration system at this stage needs to reduce the temperature of all the raw material in the freezing cylinder from the room temperature (in general, 5-30 degrees centigrade) to the freezing point, in general, the time takes up 80% of the refrigeration period of the conventional ice cream machine, at this stage, all the ice cream material is liquid, and the ice cream cannot be sold at this stage. When entering the second stage, a part of the ice cream material in the freezing cylinder starts to solidify from the freezing point into the solid ice cream until all the ice cream material is formed, this stage generally takes up 15% of the refrigeration period of the conventional ice cream machine, and at this stage, since the ice cream material is a liquid-solid mixture and is not completely formed, the ice cream generally cannot be sold at this stage. When entering the third stage, the hardness/viscosity of the ice cream continues to increase, the current of the stirring motor is rapidly increased, the rotating speed is rapidly reduced, at this stage, since the ice cream in the freezing cylinder is completely formed, but the set maximum hardness/viscosity value (also a shutdown value) is not reached, the ice cream in the freezing cylinder may be sold at this stage, and the shape and mouthfeel (hardness and puffing rate) of the ice cream are better when getting closer to the set maximum hardness/viscosity. After reaching the maximum hardness/viscosity, the fourth stage is entered, the machine is on standby, the compressor stops working after the machine is on standby, the temperature of the ice cream in the freezing cylinder is gradually increased, the hardness/viscosity starts to decrease, the ice cream may be sold at the fourth stage, but as the standby time is longer (the compressor stops longer), the hardness/viscosity, mouthfeel and puffing rate of the ice cream become worse. Since the compressor stops refrigerating, the compressor needs to be restarted when discharging, the melted ice cream needs to be refrigerated, and the discharging capacity is also influenced.

Through long-term analysis of the stages of the refrigeration period of the current conventional ice cream, it can be seen that it generally takes a long time from the liquid ice cream (the first stage) to the solid ice cream (the third stage), which takes up about 95% of the total period, and after the third stage is entered (when the forming hardness is displayed in a percentage mode, in general, when more than 80% is formed, the forming ratio is rapidly increased to the shutdown value), in general, only about 5% of the total period is taken up to reach the shutdown value. While all the ice cream machines discharge at this stage, the viscosity/hardness and shape of the ice cream are the best, and the mouthfeel is also the best. Since the compressor continues to operate without entering the standby state, the discharge capacity of the ice cream is also the most.

Therefore, an existing ice cream machine refrigeration and control system generally has the following problems.

During the entire ice cream making period, the time of the stage (that is, the above third stage) at which the condition of the ice cream in the freezing cylinder of the ice cream machine is the best is often short, an operator needs to grasp the time point to discharge (that is, sell the ice cream), the state of the sold ice cream is the best, and either before or after this time point, the discharging quality will be influenced, thereby influencing the mouthfeel, the puffing rate, and the discharging capacity. In particular, in an unmanned automatic ice cream apparatus, since the operator does not directly contact a running state of the machine, it is impossible to predict when the ice cream is discharged and sold. Therefore, it is critical how to discharge in as much time as possible and maintain the mouthfeel of the ice cream in a better state.

SUMMARY

The technical problem to be solved by the invention is to provide a mouthfeel maintaining method of an ice cream machine, so as to solve the problem that the time when the ice cream made in a freezing cylinder of the existing ice cream machine is in a good state (that is, a forming solid stage: the stage at which the ice cream material reaches the set maximum hardness/viscosity from being completely solidified into a solid) is short.

To solve the above technical problem, the invention adopts the technical solution as follows.

A mouthfeel maintaining method of an ice cream machine is provided. The ice cream machine is equipped with a freezing cylinder, a stirring device, a main refrigeration system, and a control system. The control system controls the ice cream machine to work periodically. Firstly, the ice cream machine is enabled to enter a refrigeration state, that is, the main refrigeration system is controlled to refrigerate ice cream material in the freezing cylinder, and the stirring device is controlled to stir the ice cream material in the freezing cylinder. Then, when the ice cream material in the freezing cylinder reaches preset hardness or a preset viscosity value, a standby state is entered, that is, the main refrigeration system and the stirring device are controlled to stop. Finally, when the time for entering the standby state reaches preset time, this period is finished, and the refrigeration state is reentered to start the next period.

When the ice cream material in the freezing cylinder is in a forming solid stage, the control system controls the ice cream machine to enter a mouthfeel maintaining state. The forming solid stage is: a stage starting from when all the ice cream material in the freezing cylinder is converted into all-solid ice cream until the preset hardness or the preset viscosity value is reached. The mouthfeel maintaining state is as follows that: the main refrigeration system refrigerates the ice cream material in the freezing cylinder according to the refrigeration capacity close to the lower limit refrigeration capacity. The lower limit refrigeration capacity is the refrigeration capacity required to maintain the current hardness of the ice cream material unchanged. Moreover, the ice cream machine can discharge the all-solid ice cream in the freezing cylinder in the mouthfeel maintaining state.

As a preferred embodiment of the invention: the main refrigeration system is equipped with a compressor, a condenser, a throttling valve and a freezing cylinder evaporator which are sequentially connected through a pipeline, and the freezing cylinder evaporator is configured to refrigerate the ice cream material in the freezing cylinder.

A mode of controlling the ice cream machine to enter the mouthfeel maintaining state by the control system includes any one or more of the following first mode, second mode, third mode, and fourth mode.

The first mode is as follows: The throttling valve is an electronically adjustable expansion valve.

When the ice cream machine enters the mouthfeel maintaining state, the control system controls the electronically adjustable expansion valve to reduce the flow of a refrigerant.

The second mode is as follows.

The main refrigeration system is further equipped with a first shunting branch. The first shunting branch includes a first shunting electromagnetic valve, a shunting evaporator and a check valve. An inlet of the first shunting electromagnetic valve is connected with a refrigerant outlet of the condenser, an outlet of the first shunting electromagnetic valve is connected with the inlet of the check valve through the shunting evaporator, and the outlet of the check valve is connected with an air suction port of the compressor. The shunting evaporator is configured to refrigerate constituent components of the ice cream machine in addition to the freezing cylinder.

When the ice cream machine does not enter the mouthfeel maintaining state, the control system controls the first shunting electromagnetic valve to be closed. When the ice cream machine enters the mouthfeel maintaining state, the control system controls the first shunting electromagnetic valve to be opened.

The third mode is as follows.

The main refrigeration system is further equipped with a second shunting branch, the second shunting branch includes a second shunting electromagnetic valve, the inlet of the second shunting electromagnetic valve is connected with the refrigerant outlet of the condenser, and the outlet of the second shunting electromagnetic valve is connected with the air suction port of the compressor.

When the ice cream machine does not enter the mouthfeel maintaining state, the control system controls the second shunting electromagnetic valve to be closed. When the ice cream machine enters the mouthfeel maintaining state, the control system controls the second shunting electromagnetic valve to be opened.

The fourth mode is as follows.

The main refrigeration system is further equipped with a third shunting branch, the third shunting branch includes a third shunting electromagnetic valve, the inlet of the third shunting electromagnetic valve is connected with an exhaust port of the compressor, and the outlet of the third shunting electromagnetic valve is connected with the refrigerant inlet of the freezing cylinder evaporator.

When the ice cream machine does not enter the mouthfeel maintaining state, the control system controls the third shunting electromagnetic valve to be closed. When the ice cream machine enters the mouthfeel maintaining state, the control system controls the third shunting electromagnetic valve to be opened.

As a preferred embodiment of the invention: a mode of judging that the ice cream material in the freezing cylinder is in the forming solid stage by the control system is as follows.

The control system collects the rotating speed of a stirring motor in real time, and the stirring motor is configured to drive the stirring device to stir the ice cream material in the freezing cylinder.

A rotating speed threshold R1 and a rotating speed threshold Rn are preset in the control system, the rotating speed threshold R1 is a rotating speed value of the stirring motor when the ice cream material is converted from a solid-liquid coexistence state to an all-solid state, and the rotating speed threshold Rn is the rotating speed value of the stirring motor when the ice cream material reaches the preset hardness or the preset viscosity value.

When the rotating speed of the stirring motor is between the rotating speed threshold R1 and the rotating speed threshold Rn, the control system judges that the ice cream material in the freezing cylinder is in the forming solid stage.

As a preferred embodiment of the invention: a rotating speed threshold R2, a rotating speed threshold R3, and a rotating speed threshold R4 are also preset in the control system, and the rotating speed threshold R1, the rotating speed threshold R2, the rotating speed threshold R3, the rotating speed threshold R4, and the rotating speed threshold Rn are sequentially reduced.

A method of controlling the ice cream machine to be maintained in the mouthfeel maintaining state by the control system is as follows.

When the rotating speed of the stirring motor is reduced to the rotating speed threshold R1, the control system executes any one of the first mode to the fourth mode, and at this time, the rest three modes in the first mode to the fourth mode are not executed.

When the rotating speed of the stirring motor is reduced to the rotating speed threshold R2, the control system executes any one of the rest three modes, and at this time, the rest two modes in the first mode to the fourth mode are not executed.

When the rotating speed of the stirring motor is reduced to the rotating speed threshold R3, the control system executes any one of the rest two modes, and at this time, the last mode in the first mode to the fourth mode is not executed.

When the rotating speed of the stirring motor is reduced to the rotating speed threshold R4, the control system executes the last mode.

As a preferred embodiment of the invention: a mode of judging that the ice cream material in the freezing cylinder is in the forming solid stage by the control system is as follows.

The control system collects a working current of the stirring motor in real time, and the stirring motor is configured to drive the stirring device to stir the ice cream material in the freezing cylinder.

A working current threshold I1 and a working current threshold In are preset in the control system, the working current threshold I1 is a working current value of the stirring motor when the ice cream material is converted from the solid-liquid coexistence state to the all-solid state, and the working current threshold In is the working current value of the stirring motor when the ice cream material reaches the preset hardness or the preset viscosity value.

When the working current of the stirring motor is between the working current threshold I1 and the working current threshold In, the control system judges that the ice cream material in the freezing cylinder is in the forming solid stage.

As a preferred embodiment of the invention: a working current threshold I2, a working current threshold I3, and a working current threshold I4 are also preset in the control system, and the working current threshold I1, the working current threshold I2, the working current threshold I3, the working current threshold I4, and the working current threshold In are sequentially increased.

A method of controlling the ice cream machine to be maintained in the mouthfeel maintaining state by the control system is as follows.

When the working current of the stirring motor is increased to the working current threshold I1, the control system executes any one of the first mode to the fourth mode, and at this time, the rest three modes in the first mode to the fourth mode are not executed.

When the working current of the stirring motor is increased to the working current threshold I2, the control system executes any one of the rest three modes, and at this time, the rest two modes in the first mode to the fourth mode are not executed.

When the working current of the stirring motor is increased to the working current threshold I3, the control system executes any one of the rest two modes, and at this time, the last mode in the first mode to the fourth mode is not executed.

When the working current of the stirring motor is increased to the working current threshold I4, the control system executes the last mode.

As a preferred embodiment of the invention: a mode of judging that the ice cream material in the freezing cylinder is in the forming solid stage by the control system is as follows.

The control system collects the temperature of the ice cream material in the freezing cylinder in real time.

A temperature threshold T1 and a temperature threshold Tn are preset in the control system, the temperature threshold T1 is a temperature value of the stirring motor when the ice cream material is converted from the solid-liquid coexistence state to the all-solid state, and the temperature threshold Tn is the temperature value of the stirring motor when the ice cream material reaches the preset hardness or the preset viscosity value.

When the temperature of the ice cream material is between the temperature threshold T1 and the temperature threshold Tn, the control system judges that the ice cream material in the freezing cylinder is in the forming solid stage.

As a preferred embodiment of the invention: a temperature threshold T2, a temperature threshold T3, and a temperature threshold T4 are also preset in the control system, and the temperature threshold T1, the temperature threshold T2, the temperature threshold T3, the temperature threshold T4, and the temperature threshold Tn are sequentially reduced.

A method of controlling the ice cream machine to be maintained in the mouthfeel maintaining state by the control system is as follows.

When the temperature of the ice cream material is reduced to the temperature threshold T1, the control system executes any one of the first mode to the fourth mode, and at this time, the rest three modes in the first mode to the fourth mode are not executed.

When the temperature of the ice cream material is reduced to the temperature threshold T2, the control system executes any one of the rest three modes, and at this time, the rest two modes in the first mode to the fourth mode are not executed.

When the temperature of the ice cream material is reduced to the temperature threshold T3, the control system executes any one of the rest two modes, and at this time, the last mode in the first mode to the fourth mode is not executed.

When the temperature of the ice cream material is reduced to the temperature threshold T4, the control system executes the last mode.

As a preferred embodiment of the invention: when the ice cream machine is in the mouthfeel maintaining state and the ice cream in the freezing cylinder is discharged, the control system controls the ice cream machine to exit the mouthfeel maintaining state and enter a refrigeration state.

As a preferred embodiment of the invention: the maximum maintaining time or the maximum number of maintaining refrigeration circulating periods are preset in the control system, when the ice cream machine enters the mouthfeel maintaining state, the control system starts timing or starts calculating the number of the refrigeration circulating periods, when the timing time reaches the maximum maintaining time or the accumulated number of the refrigeration circulating periods reaches the maximum number of maintaining refrigeration circulating periods, the control system controls the ice cream machine to exit the mouthfeel maintaining state and enter a standby state, and the single periodic working of the ice cream machine is referred to as one refrigeration circulating period. Therefore, when the ice cream machine reaches the maximum maintaining time or the maximum number of maintaining circulating periods without discharging, mouthfeel maintenance is canceled, and when the discharging is performed, the mouthfeel maintaining period is restored (this design may save energy as much as possible, reduce the working time of the system under the condition of unmanned selling and realize the mouthfeel maintenance as much as possible under the condition of manned selling).

Compared with the conventional art, the invention has the following beneficial effects.

Firstly, according to the invention, when the ice cream material in the freezing cylinder is at the forming solid stage, the ice cream machine is controlled to enter the mouthfeel maintaining state, so that the time of the ice cream in the freezing cylinder at the forming solid stage may be prolonged, and the ice cream in the freezing cylinder may be maintained in a state with the better mouthfeel for a longer time, that is, the hardness/viscosity and the puffing rate are better.

Therefore, the invention has the following advantages.

Firstly, the problem that the discharging is unstable resulting from the fact that the conventional ice cream machine can only discharge at the standby state due to too short time in the forming solid stage is solved, the ice cream machine is ensured to be at the forming solid stage for most of the time after entering the forming solid stage for the first time, the discharging may be performed at any time, and the mouthfeel consistency is good.

Secondly, by prolonging the time of the forming solid stage, the time for the ice cream machine to sell the ice cream in a better state is prolonged to several minutes or more from several seconds and tens of seconds, so that an operator may sell the ice cream with better mouthfeel (that is, better hardness/viscosity and puffing rate) in a longer time range.

Thirdly, the all-solid ice cream in the freezing cylinder is continuously discharged in the mouthfeel maintaining state, and compared with the discharging in the standby state, the continuous discharging capacity is higher.

In addition, according to the invention, the control system may control the ice cream machine to enter the mouthfeel maintaining state in a mode of any one or any combination of any multiple modes in the four modes (the first mode, the second mode, the third mode, and the fourth mode), so that according to the invention, the control system can control the time for maintaining the ice cream material in the freezing cylinder at the forming solid stage through selection of a combined mode of the four modes.

BRIEF DESCRIPTION OF THE DRAWINGS

The invention will be described in more detail below in combination with the accompanying drawings and specific embodiments.

DETAILED DESCRIPTION OF THE EMBODIMENTS

The invention will be further described below in combination with the embodiments.

First Embodiment

Figure 1:
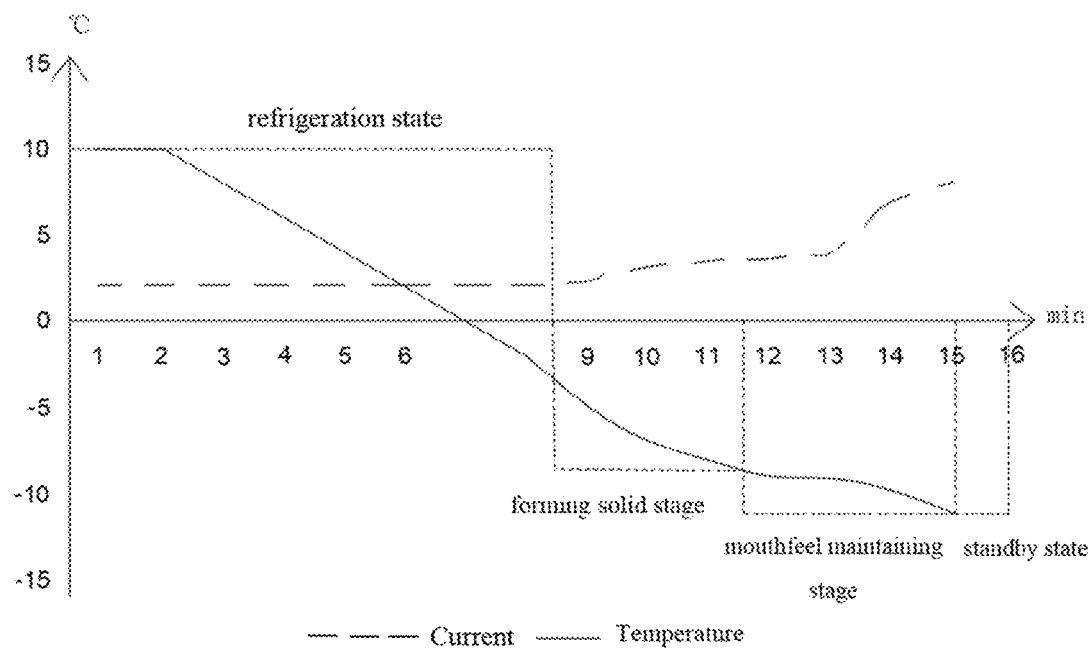
FIG. 1 is a schematic diagram showing changes of temperature and current of a stirring motor in four stages.
Figure 2A:
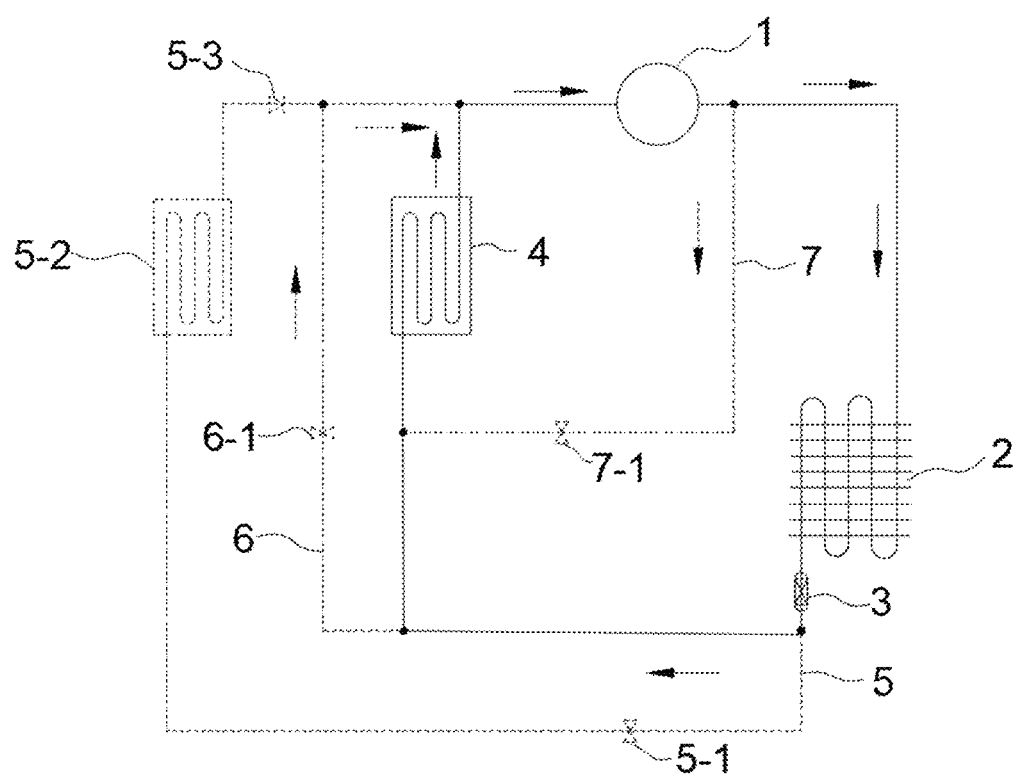
FIGS. 2A, 2B, 2C, and 2D is a structural schematic view of a main refrigeration system of the invention.
Figure 2B:
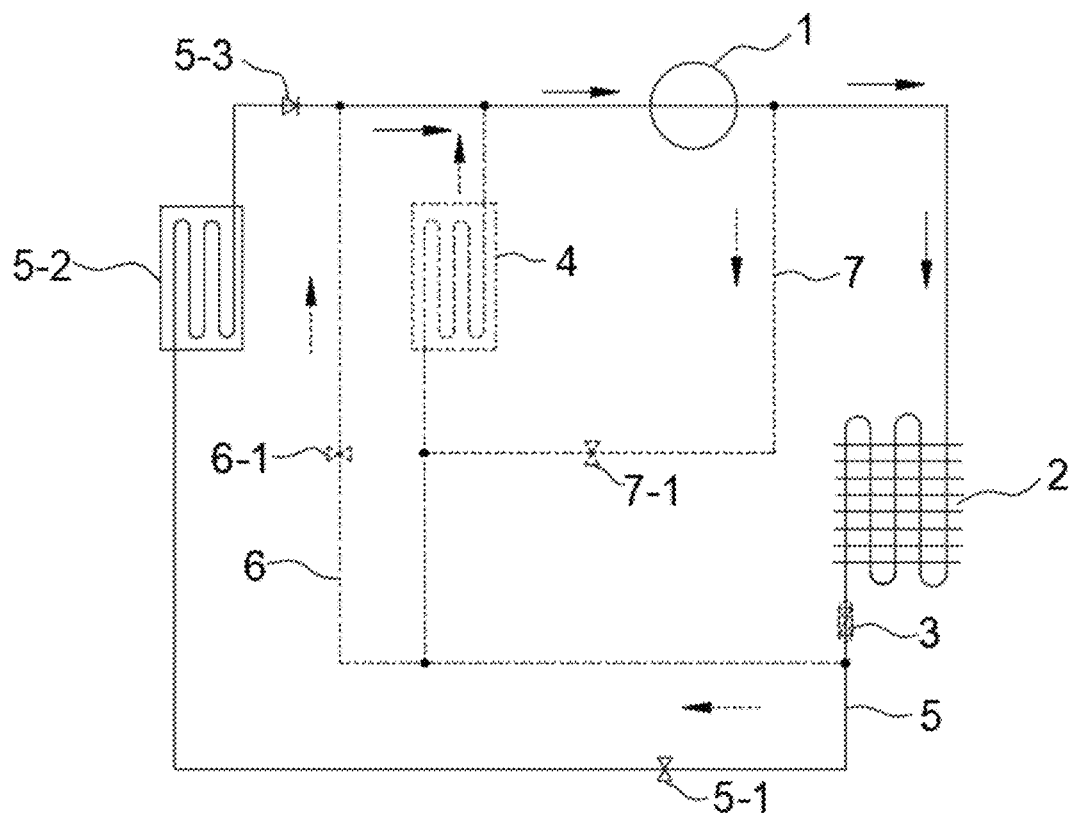
Figure 2C:
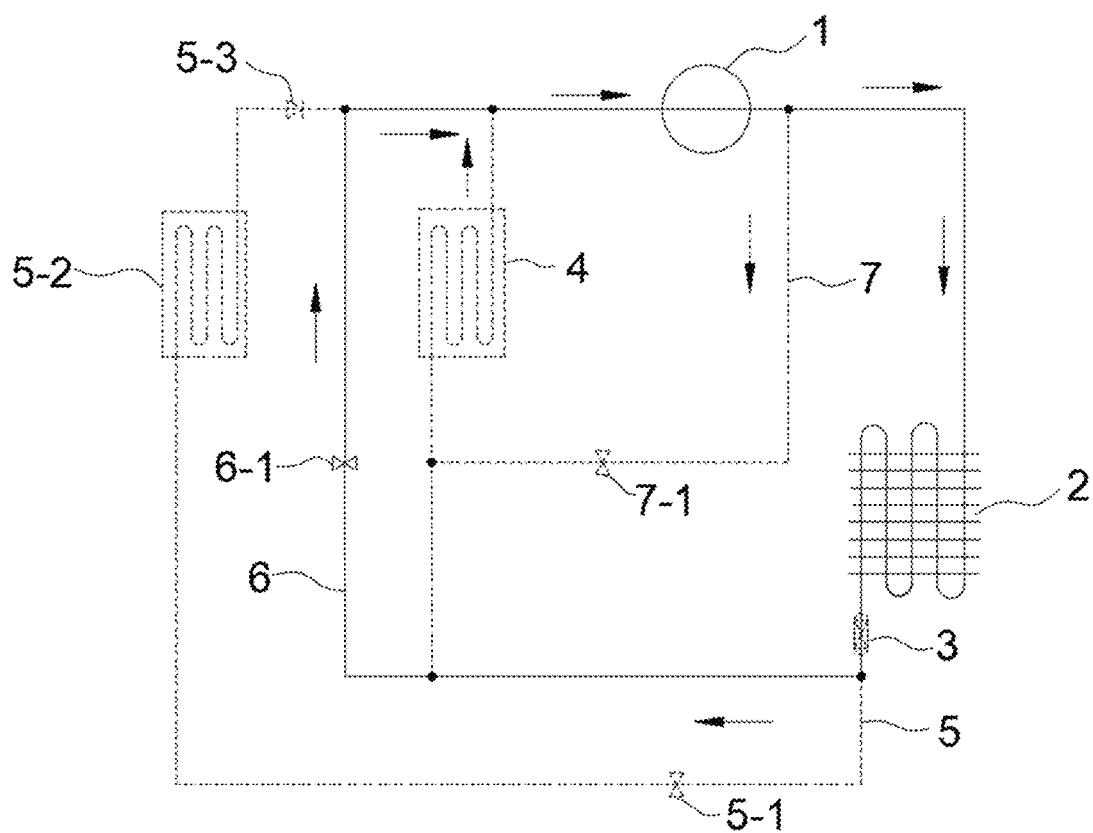
Figure 2D:
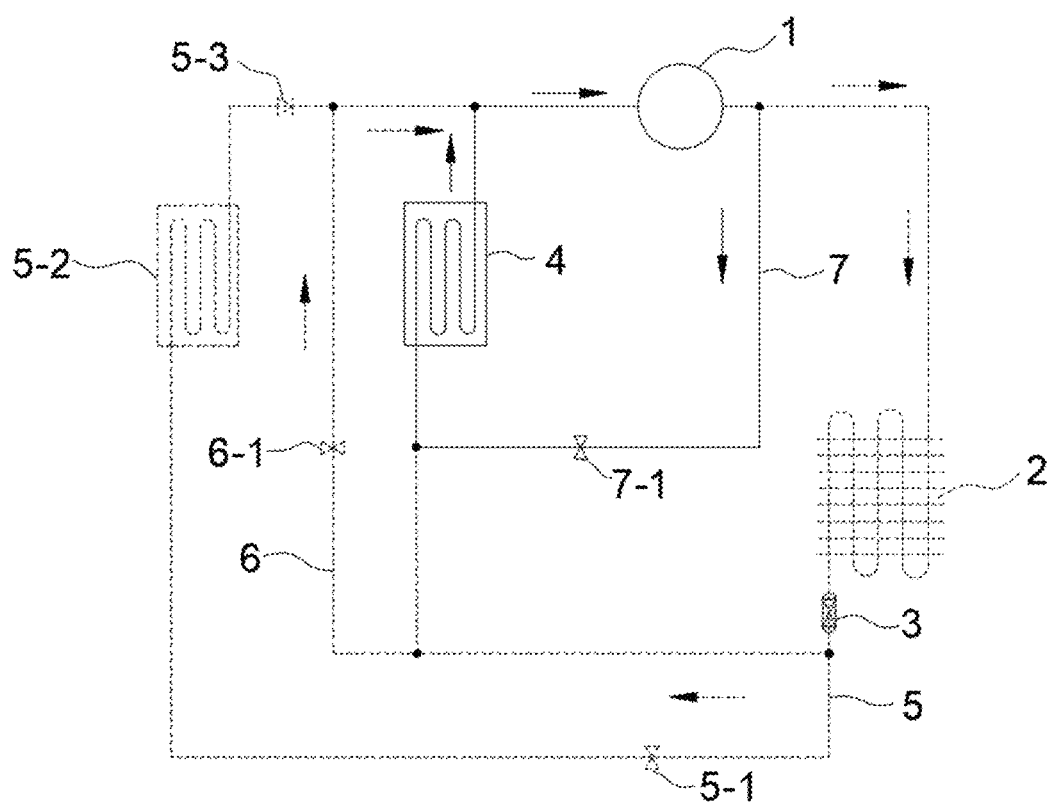

As shown in FIGS. 2A, 2B, 2C, and 2D, the invention discloses a mouthfeel maintaining method of an ice cream machine. The ice cream machine is equipped with a freezing cylinder, a stirring device, a main refrigeration system, and a control system. The control system controls the ice cream machine to work periodically. Firstly, the ice cream machine enters a refrigeration state, that is, the main refrigeration system is controlled to refrigerate ice cream material in the freezing cylinder, and the stirring device is controlled to stir the ice cream material in the freezing cylinder. Then, when the ice cream material in the freezing cylinder reaches preset hardness or a preset viscosity value, a standby state is entered, that is, the main refrigeration system and the stirring device are controlled to stop. Finally, when the time for entering the standby state reaches preset time, this period is finished, the refrigeration state is reentered, and the next period is started.

Therefore, the period starting from when the ice cream material in the freezing cylinder is liquid until the ice cream machine renters the standby state is divided into four stages that: a first stage is a refrigeration starting stage, a second stage is a solid-liquid coexistence stage, a third stage is a forming solid stage, and a fourth stage is a standby stage, seeing the analysis in the background section of the present application for details.

When the ice cream material in the freezing cylinder is in a forming solid stage, the control system controls the ice cream machine to enter a mouthfeel maintaining state. The forming solid stage is: a stage starting from when all the ice cream material in the freezing cylinder is converted into all-solid ice cream until the preset hardness or the preset viscosity value is reached. The mouthfeel maintaining state is as follows that: the main refrigeration system refrigerates the ice cream material in the freezing cylinder according to the refrigeration capacity close to the lower limit refrigeration capacity. The lower limit refrigeration capacity is the refrigeration capacity required to maintain the current hardness of the ice cream material unchanged.

That is, in addition to the forming solid stage, when the ice cream material is at the refrigeration starting stage (the ice cream material is liquid), the solid-liquid coexistence stage (the ice cream material is in liquid-solid coexistence), and the standby stage (at the standby state, the temperature of the ice cream material is gradually increased), the mouthfeel maintaining state is not started.

Moreover, the ice cream machine can discharge the all-solid ice cream in the freezing cylinder in the mouthfeel maintaining state.

Therefore, according to the invention, the time of the ice cream in the freezing cylinder at the forming solid stage may be prolonged, so that the ice cream in the freezing cylinder may be maintained in a state with the better mouthfeel for a longer time, that is, the hardness/viscosity and the puffing rate are better.

Therefore, the invention has the following advantages.

Firstly, the problem that the discharging is unstable resulting from the fact that the conventional ice cream machine can only discharge in the standby state due to too short time at the forming solid stage is solved, the ice cream machine is ensured to be at the forming solid stage for most of the time after entering the forming solid stage for the first time, the discharging may be performed at any time, and the mouthfeel consistency is good.

Secondly, by prolonging the time of the forming solid stage, the time for the ice cream machine to sell the ice cream in a better state is prolonged to several minutes or more from several seconds and tens of seconds, so that an operator may sell the ice cream with better hardness/viscosity, mouthfeel and puffing rate in a longer time range.

Thirdly, the all-solid ice cream in the freezing cylinder is continuously discharged in the mouthfeel maintaining state, and compared with the discharging in the standby state, the continuous discharging capacity is higher.

Second Embodiment

Based on the first embodiment, the second embodiment also adopts the following preferred structure.

The main refrigeration system is equipped with a compressor 1, a condenser 2, a throttling valve 3, and a freezing cylinder evaporator 4 which are sequentially connected through a pipeline. The freezing cylinder evaporator 4 is configured to refrigerate the ice cream material in the freezing cylinder. This part is a conventional refrigeration system. A working principle is as follows that: after absorbing the heat of the ice cream material in the freezing cylinder in the freezing cylinder evaporator 4, a low-pressure liquid refrigerant is vaporized into low-temperature and low-pressure steam and is sucked by the compressor 1, the low-temperature and low-pressure steam is compressed into high-pressure and high-temperature steam by the compressor 1 and then is discharged into the condenser 2, the high-pressure and high-temperature steam releases the heat to a cooling medium (water or air) in the condenser 2 and is condensed into a high-pressure liquid refrigerant, the high-pressure liquid refrigerant is throttled by the throttling valve 3 into the low-pressure liquid refrigerant, and the low-pressure liquid refrigerant reenters the freezing cylinder evaporator 4 to absorb the heat and then is vaporized, thereby forming circulating refrigeration.

A mode of controlling the ice cream machine to enter the mouthfeel maintaining state by the control system includes any one or more of the following first mode, second mode, third mode, and fourth mode, that is: when the ice cream machine enters the mouthfeel maintaining state, any one of the following four modes (for example, only the first mode is executed, or only the third mode is executed, and the like) may be executed, any two modes (for example, the first mode and the second mode are executed simultaneously, or the third mode and the fourth mode are executed simultaneously, and the like) may also be executed, or any three modes (for example, the first mode to the third mode are executed simultaneously, or the second mode to the fourth mode are executed simultaneously, and the like), or all the four modes may be executed. In addition, when the ice cream machine enters the mouthfeel maintaining state, the order of executing the following four modes may also be set according to a system design of the ice cream machine (preferred solutions in feasible solutions are given in the fourth embodiment and the sixth embodiment of the invention).

The first mode is as follows.

The throttling valve 3 is an electronically adjustable expansion valve.

When the ice cream machine enters the mouthfeel maintaining state, the control system controls the electronically adjustable expansion valve to reduce the flow of a refrigerant, so as to adjust the refrigeration capacity of the ice cream in the freezing cylinder and realize the purpose of maintaining the hardness of the ice cream.

The second mode is as follows.

The main refrigeration system is further equipped with a first shunting branch 5. The first shunting branch 5 includes a first shunting electromagnetic valve 5-1, a shunting evaporator 5-2, and a check valve 5-3. An inlet of the first shunting electromagnetic valve 5-1 is connected with a refrigerant outlet of the condenser 2, an outlet of the first shunting electromagnetic valve 5-1 is connected with the inlet of the check valve 5-3 through the shunting evaporator 5-2, and the outlet of the check valve 5-3 is connected with an air suction port of the compressor 1. The shunting evaporator 5-2 is configured to refrigerate constituent components of the ice cream machine in addition to the freezing cylinder. The constituent components may be a pre-cooling loop and/or a preservation loop of a material basin of the ice cream machine and may also be other refrigeration loops.

When the ice cream machine does not enter the mouthfeel maintaining state, the control system controls the first shunting electromagnetic valve 5-1 to be closed; when the ice cream machine enters the mouthfeel maintaining state, the control system controls the first shunting electromagnetic valve 5-1 to be opened; therefore, in the mouthfeel maintaining state, a part of the low-pressure liquid refrigerant output by the throttling valve 3 flows to the shunting evaporator 5-2, so that the flow rate of the refrigerant flowing through the freezing cylinder evaporator 4 is reduced compared with that in the refrigeration state, and the main refrigeration system refrigerates the ice cream material in the freezing cylinder according to the refrigeration capacity close to the lower limit refrigeration capacity.

The third mode is as follows.

The main refrigeration system is further equipped with a second shunting branch 6, the second shunting branch 6 includes a second shunting electromagnetic valve 6-1, the inlet of the second shunting electromagnetic valve 6-1 is connected with the refrigerant outlet of the condenser 2, and the outlet of the second shunting electromagnetic valve 6-1 is connected with the air suction port of the compressor 1.

When the ice cream machine does not enter the mouthfeel maintaining state, the control system controls the second shunting electromagnetic valve 6-1 to be closed; when the ice cream machine enters the mouthfeel maintaining state, the control system controls the second shunting electromagnetic valve 6-1 to be opened; therefore, in the mouthfeel maintaining state, a part of the low-pressure liquid refrigerant output by the throttling valve 3 directly reflows to the compressor 1, so that the flow rate of the refrigerant flowing through the freezing cylinder evaporator 4 is reduced compared with that in the refrigeration state, and the main refrigeration system refrigerates the ice cream material in the freezing cylinder according to the refrigeration capacity close to the lower limit refrigeration capacity.

The fourth mode is as follows.

The main refrigeration system is equipped with a third shunting branch 7, the third shunting branch 7 includes a third shunting electromagnetic valve 7-1, the inlet of the third shunting electromagnetic valve 7-1 is connected with an exhaust port of the compressor 1, and the outlet of the third shunting electromagnetic valve 7-1 is connected with the refrigerant inlet of the freezing cylinder evaporator 4.

When the ice cream machine does not enter the mouthfeel maintaining state, the control system controls the third shunting electromagnetic valve 7-1 to be closed; when the ice cream machine enters the mouthfeel maintaining state, the control system controls the third shunting electromagnetic valve 7-1 to be opened; therefore, in the mouthfeel maintaining state, a part of the high-pressure and high-temperature stream output by the compressor 1 flows to the freezing cylinder evaporator 4 and neutralizes the low-pressure liquid refrigerant flowing through the freezing cylinder evaporator 4, so that the refrigeration temperature of the freezing cylinder evaporator 4 to the freezing cylinder is increased, and the main refrigeration system refrigerates the ice cream material in the freezing cylinder according to the refrigeration capacity close to the lower limit refrigeration capacity.

Therefore, according to the invention, through selection of a combined mode of the above four modes, the time for maintaining the ice cream material in the freezing cylinder at the forming solid stage is controlled, the above second mode is the best mode, and the second mode is preferably adopted.

Third Embodiment

Based on the above second embodiment, a mode of judging that the ice cream material in the freezing cylinder is in the forming solid stage by the control system is as follows.

The control system collects the rotating speed of a stirring motor in real time, and the stirring motor is configured to drive the stirring device to stir the ice cream material in the freezing cylinder.

A rotating speed threshold $R1$ and a rotating speed threshold $Rn$ are preset in the control system, the rotating speed threshold $R1$ is a rotating speed value of the stirring motor when the ice cream material is converted from a solid-liquid coexistence state to an all-solid state, and the rotating speed threshold $Rn$ is the rotating speed value of the stirring motor when the ice cream material reaches the preset hardness or the preset viscosity value.

When the rotating speed of the stirring motor is between the rotating speed threshold $R1$ and the rotating speed threshold $Rn$, the control system judges that the ice cream material in the freezing cylinder is in the forming solid stage.

Fourth Embodiment

Based on the above third embodiment, in the fourth embodiment of the invention, a rotating speed threshold $R2$, a rotating speed threshold $R3$, and a rotating speed threshold $R4$ are also preset in the control system, and the rotating speed threshold $R1$, the rotating speed threshold $R2$, the rotating speed threshold $R3$, the rotating speed threshold $R4$, and the rotating speed threshold $Rn$ are sequentially reduced.

A method of controlling the ice cream machine to be maintained in the mouthfeel maintaining state by the control system is as follows.

When the rotating speed of the stirring motor is reduced to the rotating speed threshold $R1$, the control system executes any one of the first mode to the fourth mode, and at this time, the rest three modes in the first mode to the fourth mode are not executed.

When the rotating speed of the stirring motor is reduced to the rotating speed threshold $R2$, the control system executes any one of the rest three modes, and at this time, the rest two modes in the first mode to the fourth mode are not executed.

When the rotating speed of the stirring motor is reduced to the rotating speed threshold $R3$, the control system executes any one of the rest two modes, and at this time, the last mode in the first mode to the fourth mode is not executed.

When the rotating speed of the stirring motor is reduced to the rotating speed threshold $R4$, the control system executes the last mode.

Fifth Embodiment

Based on the above second embodiment, a mode of judging that the ice cream material in the freezing cylinder is in the forming solid stage by the control system is as follows.

The control system collects a working current of the stirring motor in real time, and the stirring motor is configured to drive the stirring device to stir the ice cream material in the freezing cylinder.

A working current threshold $I1$ and a working current threshold $In$ are preset in the control system, the working current threshold $I1$ is a working current value of the stirring motor when the ice cream material is converted from the solid-liquid coexistence state to the all-solid state, and the working current threshold $In$ is the working current value of the stirring motor when the ice cream material reaches the preset hardness or the preset viscosity value.

When the working current of the stirring motor is between the working current threshold I1 and the working current threshold In, the control system judges that the ice cream material in the freezing cylinder is in the forming solid stage.

Sixth Embodiment

Based on the above fifth embodiment, in the sixth embodiment of the invention, a working current threshold I2, a working current threshold I3, and a working current threshold I4 are also preset in the control system, and the working current threshold I1, the working current threshold I2, the working current threshold I3, the working current threshold I4, and the working current threshold In are sequentially increased.

A method of controlling the ice cream machine to be maintained in the mouthfeel maintaining state by the control system is as follows.

When the working current of the stirring motor is increased to the working current threshold I1, the control system executes any one of the first mode to the fourth mode, and at this time, the rest three modes in the first mode to the fourth mode are not executed.

When the working current of the stirring motor is increased to the working current threshold I2, the control system executes any one of the rest three modes, and at this time, the rest two modes in the first mode to the fourth mode are not executed.

When the working current of the stirring motor is increased to the working current threshold I3, the control system executes any one of the rest two modes, and at this time, the last mode in the first mode to the fourth mode is not executed.

When the working current of the stirring motor is increased to the working current threshold I4, the control system executes the last mode.

Seventh Embodiment

Based on the above second embodiment, a mode of judging that the ice cream material in the freezing cylinder is in the forming solid stage by the control system is as follows.

The control system collects the temperature of the ice cream material in the freezing cylinder in real time.

A temperature threshold T1 and a temperature threshold Tn are preset in the control system, the temperature threshold T1 is a temperature value of the stirring motor when the ice cream material is converted from the solid-liquid coexistence state to the all-solid state, and the temperature threshold Tn is the temperature value of the stirring motor when the ice cream material reaches the preset hardness or the preset viscosity value.

When the temperature of the ice cream material is between the temperature threshold T1 and the temperature threshold Tn, the control system judges that the ice cream material in the freezing cylinder is in the forming solid stage.

Eighth Embodiment

Based on the above seventh embodiment, in the eighth embodiment of the invention, a temperature threshold T2, a temperature threshold T3, and a temperature threshold T4 are also preset in the control system, and the temperature threshold T1, the temperature threshold T2, the temperature threshold T3, the temperature threshold T4, and the temperature threshold Tn are sequentially reduced.

A method of controlling the ice cream machine to be maintained in the mouthfeel maintaining state by the control system is as follows.

When the temperature of the ice cream material is reduced to the temperature threshold T1, the control system executes any one of the first mode to the fourth mode, and at this time, the rest three modes in the first mode to the fourth mode are not executed.

When the temperature of the ice cream material is reduced to the temperature threshold T2, the control system executes any one of the rest three modes, and at this time, the rest two modes in the first mode to the fourth mode are not executed.

When the temperature of the ice cream material is reduced to the temperature threshold T3, the control system executes any one of the rest two modes, and at this time, the last mode in the first mode to the fourth mode is not executed.

When the temperature of the ice cream material is reduced to the temperature threshold T4, the control system executes the last mode.

Ninth Embodiment

Based on any one of the above first embodiment to the eighth embodiment, the ninth embodiment also adopts the following preferred structure.

When the ice cream machine is in the mouthfeel maintaining state and the ice cream in the freezing cylinder is discharged, the control system controls the ice cream machine to exit the mouthfeel maintaining state and enter a refrigeration state, so that all the refrigeration capacity of the refrigeration system meets a refrigeration requirement of the freezing cylinder.

Tenth Embodiment

Based on any one of the above first embodiment to ninth embodiment, the tenth embodiment also adopts the following preferred structure.

The maximum maintaining time or the maximum number of maintaining refrigeration circulating periods are preset in the control system, when the ice cream machine enters the mouthfeel maintaining state, the control system starts timing or starts calculating the number of the refrigeration circulating periods, when the timing time reaches the maximum maintaining time or the accumulated number of the refrigeration circulating periods reaches the maximum number of maintaining refrigeration circulating periods, the control system controls the ice cream machine to exit the mouthfeel maintaining state and enter a standby state, so that energy loss due to the fact that no one buys the ice cream for a long time is avoided. The single periodic working of the ice cream machine is referred to as one refrigeration circulating period.

The invention is not limited to the above specific embodiments. According to the above content and the general technical knowledge and customary means in the art, equivalent modifications, substitutions, or alterations of the invention in other forms may be made without departing from the above basic technical idea of the invention, and all the equivalent modifications, substitutions, or alterations fall within the protection scope of the invention.

What is claimed is:

1. A mouthfeel maintaining method of an ice cream machine, the ice cream machine being equipped with a freezing cylinder, a stirrer, a main refrigeration system, and a control system, wherein the control system controls the ice cream machine to work periodically: firstly, enabling the ice cream machine to enter a refrigeration state, that is, controlling the main refrigeration system to refrigerate ice cream material in the freezing cylinder, and controlling the stirrer to stir the ice cream material in the freezing cylinder; then, entering a standby state when the ice cream material in the freezing cylinder reaching preset hardness or a preset viscosity value, that is, controlling the main refrigeration system and the stirrer to stop; and finally, finishing this period when the time for entering the standby state reaches preset time, and reentering the refrigeration state to start the next period, wherein when the ice cream material in the freezing cylinder is in a forming solid stage during the refrigeration state, the control system controls the ice cream machine to enter a mouthfeel maintaining state, the forming solid stage being: a stage starting from the time that all the ice cream material in the freezing cylinder is converted into all-solid ice cream until the preset hardness or the preset viscosity value is reached, the mouthfeel maintaining state being as follows: the main refrigeration system refrigerates the ice cream material in the freezing cylinder according to the refrigeration capacity close to the lower limit refrigeration capacity, the lower limit refrigeration capacity being the refrigeration capacity required to maintain the current hardness of the ice cream material unchanged; and the ice cream machine is capable of discharging the all-solid ice cream in the freezing cylinder in the mouthfeel maintaining state, wherein a rotating speed threshold R2, a rotating speed threshold R3, and a rotating speed threshold R4 are also preset in the control system, and the rotating speed threshold R1, the rotating speed threshold R2, the rotating speed threshold R3, the rotating speed threshold R4, and the rotating speed threshold Rn are sequentially reduced;

a method of controlling the ice cream machine to be maintained in the mouthfeel maintaining state by the control system being:

when the rotating speed of the stirring motor is reduced to the rotating speed threshold R1, the control system executes any one of the first mode to the fourth mode, and at this time, the rest three modes in the first mode to the fourth mode are not executed;

when the rotating speed of the stirring motor is reduced to the rotating speed threshold R2, the control system executes any one of the rest three modes, and at this time, the rest two modes in the first mode to the fourth mode are not executed;

when the rotating speed of the stirring motor is reduced to the rotating speed threshold R3, the control system executes any one of the rest two modes, and at this time, the last mode in the first mode to the fourth mode is not executed; and when the rotating speed of the stirring motor is reduced to the rotating speed threshold R4, the control system executes the last mode.

2. The mouthfeel maintaining method of an ice cream machine of claim 1, wherein the main refrigeration system is equipped with a compressor (1), a condenser (2), a throttling valve (3), and a freezing cylinder evaporator (4) which are sequentially connected through a pipeline, the freezing cylinder evaporator (4) being configured to refrigerate the ice cream material in the freezing cylinder; wherein a mode of controlling the ice cream machine to enter the mouthfeel maintaining state by the control system comprises any one or more of the following first mode, second mode, third mode, and fourth mode;

the first mode being:
the throttling valve (3) is an electronically adjustable expansion valve;
when the ice cream machine enters the mouthfeel maintaining state, the control system controls the electronically adjustable expansion valve to reduce the flow of a refrigerant;

the second mode being:
the main refrigeration system is further equipped with a first shunting branch (5), the first shunting branch (5) comprising a first shunting electromagnetic valve (5-1), a shunting evaporator (5-2), and a check valve (5-3), an inlet of the first shunting electromagnetic valve (5-1) being connected with a refrigerant outlet of the condenser (2), an outlet of the first shunting electromagnetic valve (5-1) being connected with the inlet of the check valve (5-3) through the shunting evaporator (5-2), the outlet of the check valve (5-3) being connected with an air suction port of the compressor (1), and the shunting evaporator (5-2) being configured to refrigerate constituent components of the ice cream machine in addition to the freezing cylinder;
when the ice cream machine does not enter the mouthfeel maintaining state, the control system controls the first shunting electromagnetic valve (5-1) to be closed, and when the ice cream machine enters the mouthfeel maintaining state, the control system controls the first shunting electromagnetic valve (5-1) to be opened;

the third mode being:
the main refrigeration system is further equipped with a second shunting branch (6), the second shunting branch (6) comprising a second shunting electromagnetic valve (6-1), the inlet of the second shunting electromagnetic valve (6-1) being connected with the refrigerant outlet of the condenser (2), and the outlet of the second shunting electromagnetic valve (6-1) being connected with the air suction port of the compressor (1),
when the ice cream machine does not enter the mouthfeel maintaining state, the control system controls the second shunting electromagnetic valve (6-1) to be closed, when the ice cream machine enters the mouthfeel maintaining state, the control system controls the second shunting electromagnetic valve (6-1) to be opened, the fourth mode being:
the main refrigeration system is further equipped with a third shunting branch (7), the third shunting branch (7) comprising a third shunting electromagnetic valve (7-1), the inlet of the third shunting electromagnetic valve (7-1) being connected with an exhaust port of the compressor (1), and the outlet of the third shunting electromagnetic valve (7-1) being connected with the refrigerant inlet of the freezing cylinder evaporator (4),
when the ice cream machine does not enter the mouthfeel maintaining state, the control system controls the third shunting electromagnetic valve (7-1) to be closed, and when the ice cream machine enters the mouthfeel maintaining state, the control system controls the third shunting electromagnetic valve (7-1) to be opened.

3. The mouthfeel maintaining method of an ice cream machine of claim 2, wherein a mode of judging that the ice cream material in the freezing cylinder is in the forming solid stage by the control system is:
collecting, by the control system, the rotating speed of a stirring motor in real time, the stirring motor being configured to drive the stirrer to stir the ice cream material in the freezing cylinder;

a rotating speed threshold R1 and a rotating speed threshold Rn being preset in the control system, wherein the rotating speed threshold R1 is a rotating speed value of the stirring motor when the ice cream material is converted from a solid-liquid coexistence state to an all-solid state, the rotating speed threshold Rn being the rotating speed value of the stirring motor when the ice cream material reaches the preset hardness or the preset viscosity value; and when the rotating speed of the stirring motor is between the rotating speed threshold R1 and the rotating speed threshold Rn, the control system judges that the ice cream material in the freezing cylinder is in the forming solid stage.

4. The mouthfeel maintaining method of an ice cream machine of claim 1, wherein when the ice cream machine is in the mouthfeel maintaining state and the ice cream in the freezing cylinder is discharged, the control system controls the ice cream machine to exit the mouthfeel maintaining state and enter a refrigeration state.

5. The mouthfeel maintaining method of an ice cream machine of claim 1, wherein: a maximum maintaining time or a maximum number of maintaining refrigeration circulating periods are preset in the control system, when the ice cream machine enters the mouthfeel maintaining state, the control system starts timing or starting-starts calculating the number of the refrigeration circulating periods, and when the timing time reaches the maximum maintaining time or the accumulated number of the refrigeration circulating periods reaches the maximum number of maintaining refrigeration circulating periods, the control system controls the ice cream machine to exit the mouthfeel maintaining state and enter a standby state, wherein a single periodic working of the ice cream machine is referred to as one refrigeration circulating period.

* * * * *